United States Patent
Li (10) Patent No.: US 6,593,552 B1
(45) Date of Patent: Jul. 15, 2003

(54) FOOD SERVING SET FOR ROASTING OVEN

(76) Inventor: George T. C. Li, 697 E. College Pkwy., Suite 26, Carson City, NV (US) 89706

( * ) Notice: Subject to any disclaimer, the term of this patent is extended or adjusted under 35 U.S.C. 154(b) by 0 days.

(21) Appl. No.: 10/047,899

(22) Filed: Jan. 14, 2002

(51) Int. Cl.⁷ ................................................. A47J 37/06
(52) U.S. Cl. ...................... 219/432; 219/433; 219/386; 99/416
(58) Field of Search ................................ 219/432, 433; 99/367, 403, 413, 415, 416

(56) References Cited

U.S. PATENT DOCUMENTS

| | | | | |
|---|---|---|---|---|
| 1,630,787 A | * | 5/1927 | Cullen | 99/416 |
| D230,243 S | | 2/1974 | Ottenstein | D7/96 |
| D283,666 S | | 5/1986 | Holzkopf | D7/38 |
| D284,727 S | | 7/1986 | Gerber | D7/21 |
| 4,646,628 A | * | 3/1987 | Lederman | 99/413 |
| 4,817,512 A | * | 4/1989 | Vangen | 99/367 |
| D305,855 S | | 2/1990 | Mandat | D7/323 |
| 5,402,714 A | * | 4/1995 | Deneault et al. | 99/416 |
| D358,292 S | | 5/1995 | Goad | D7/366 |
| 5,865,098 A | * | 2/1999 | Anelli | 219/432 |
| D431,149 S | | 9/2000 | Cooke et al. | D7/354 |
| 6,188,046 B1 | * | 2/2001 | Barrow | 219/433 |

* cited by examiner

Primary Examiner—Joseph Pelham
(74) Attorney, Agent, or Firm—Clifford F. Rey (57) ABSTRACT

A food serving set for use in combination with a roasting oven or other similar deep well cooker is disclosed. The present food serving set is comprised of a plurality of individual containers with sealable lids for maintaining food items in a ready-to-eat condition. The individual food containers are suitable for refrigeration of food items. The present serving set features a collapsible supporting rack, which positions such individual containers within the deep well cooker while in use. In one embodiment the supporting rack is foldable for convenient storage or packaging of the serving set within the interior space of the roasting oven. In an alternative embodiment the supporting rack may be easily disassembled for storage using a latching mechanism or other suitable quick connect/disconnect fasteners.

18 Claims, 10 Drawing Sheets

FOOD SERVING SET FOR ROASTING OVEN

BACKGROUND OF INVENTION

1. Field of Invention

The present invention relates to cooking appliances and, more particularly, to a food serving set for use with a roasting oven or other similar deep well cooker including a collapsible supporting rack, which can be folded and/or disassembled for storage and/or packaging within the roasting oven.

Electric cooking pots for preparing and serving hot foods are well known in the prior art. Such cooking pots typically include a deep well member and a heating element arranged in functional relation thereto for supplying heat. Such cooking pots may be provided with compartmented trays, which are disposed within the interior space of the cooker for maintaining food in a ready-to-eat condition.

However, such compartmented trays are not convenient for the storage of leftover food items due to size constraints within a typical refrigerator. Further, such serving trays are not conveniently packaged at the time of manufacture due to the lack of available space within the interior cavity of the roasting oven and as a result must be packaged and shipped separately, which increases manufacturing costs.

Thus, the present invention has been developed to resolve this problem and other shortcomings of the prior art.

2. Description of Related Prior Art

U.S. Design Pat. Nos. 230,243; 283,666; 284,727; 305,855; 358,292; and 431,149 disclose cooking appliances and/or compartmented trays of generally similar subject matter in this field of art. However, only the ornamental appearance is illustrated for these devices and no technical disclosure or functional details are discernable.

While these devices fulfill their respective, particular objectives and requirements, the aforementioned patents do not disclose the present invention. The present inventive device comprises a food serving set including a plurality of individual food containers suitable for storage, heating and serving of food items. The food containers are designed to reside in a collapsible supporting rack within the interior space of a roasting oven or other deep well cooker during use. The food containers are suitable for refrigerator storage of leftover food items being provided with sealable lids. The supporting rack may be folded and/or disassembled for storage within the interior space of the deep well cooker after use or during packaging.

In these respects the present invention substantially departs from the conventional concepts and designs of the prior art, and in so doing provides an apparatus primarily developed for the purpose of food service and storage. Advantageously, the present food serving set is conveniently stored and packaged within the interior space of the cooker.

SUMMARY OF THE INVENTION

Accordingly, the present invention provides a serving set for use with a roasting oven or other similar deep well cooker comprised of a plurality of individual containers for maintaining food items in a ready-to-eat condition. The individual food containers are suitable for refrigeration of food items. The present serving set features a collapsible supporting rack, which positions such individual containers within the deep well cooker while in use. In one embodiment the supporting rack is foldable for convenient storage of the serving set within the cavity of the roasting oven. In an alternative embodiment the supporting rack may be easily disassembled for storage using a latching mechanism for the users convenience.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures wherein:

DETAILED DESCRIPTION OF THE PREFERRED EMBODIMENTS

Figure 1:
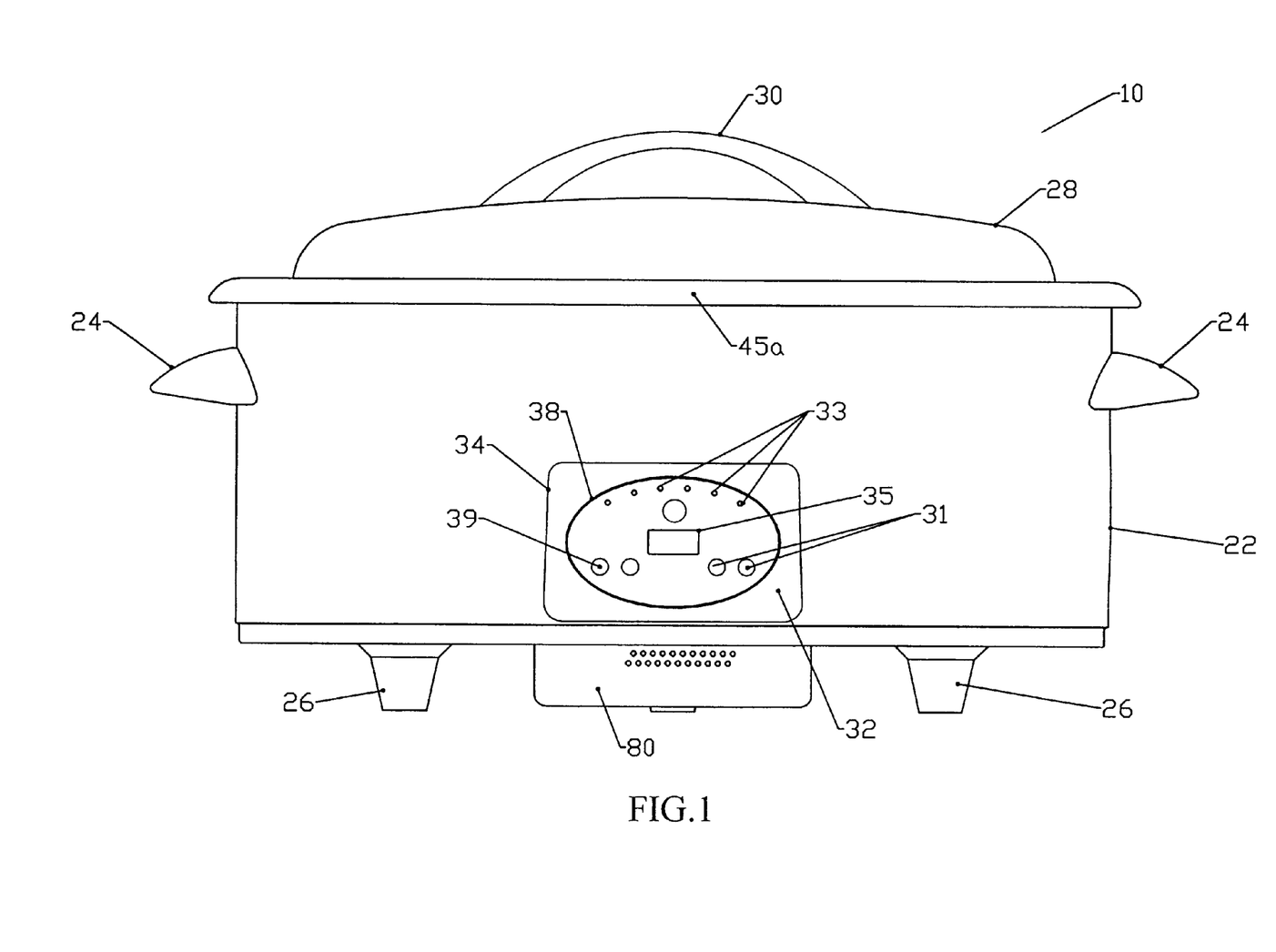
FIG. 1 is a front elevational view of a roasting oven wherein the serving set of the present invention is utilized.

Prior to describing the food serving set of the present invention in detail it may be beneficial to review the structure and function of a roasting oven or other deep well cooker wherein the present serving set is utilized. With further reference to the drawings, there is shown therein a preferred embodiment of a roasting oven in accordance with the present invention, indicated generally at 10, and illustrated in FIG. 1. The present roasting oven 10 is comprised of an outer housing 22 equipped with external handles 24 and feet 26. In the preferred embodiment the housing 22 is constructed of sheet steel or other suitable material and is provided in different exterior finishes. The roasting oven 10 is also provided with a lid 28 equipped with a handle 30. A hinge structure, indicated generally at 75, attaches the lid 28 in opening/closing relation to the housing 22.

Figure 2A:
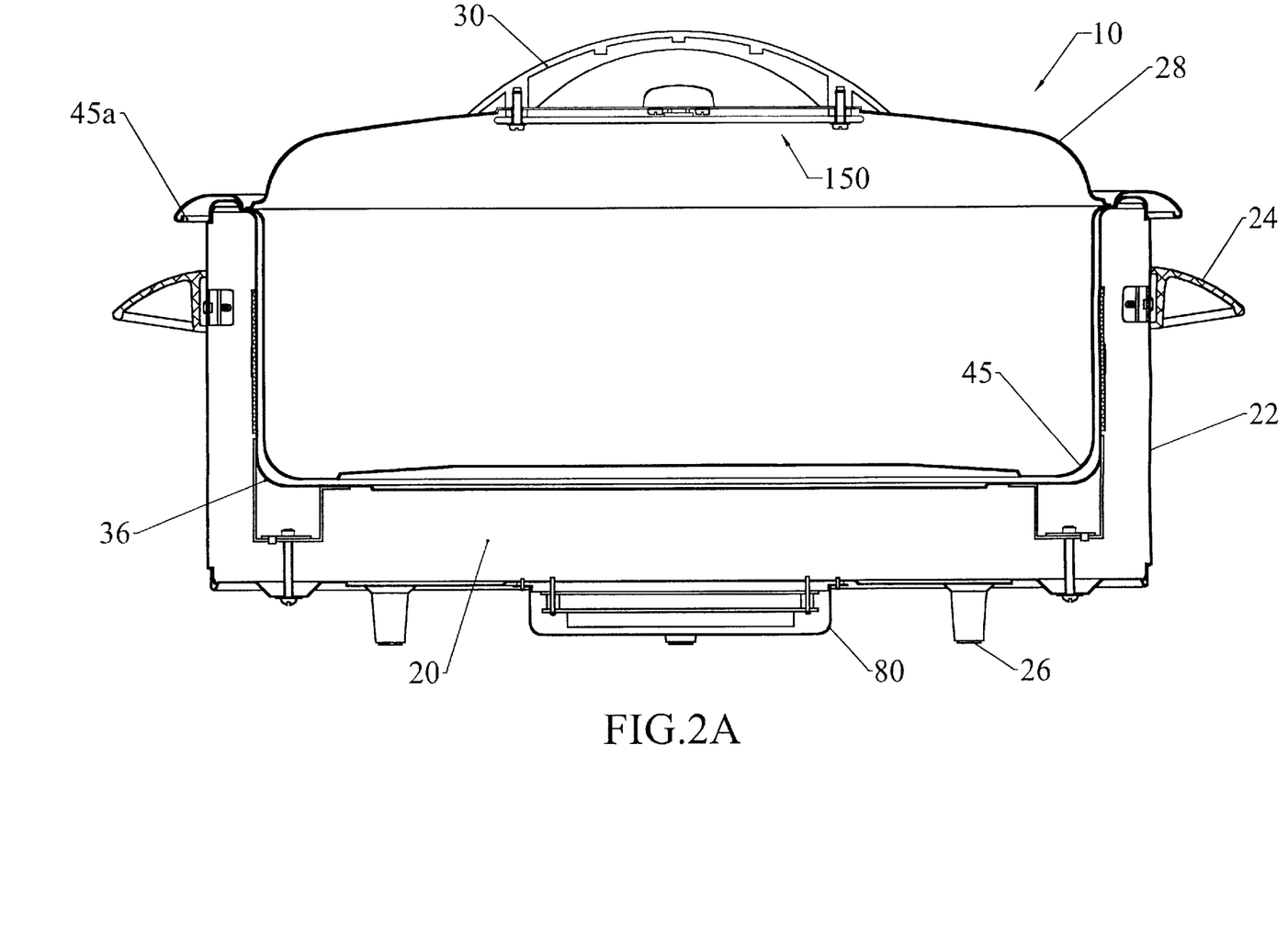
FIG. 2A is a longitudinal cross-section of the roasting oven showing details of the construction thereof.
Figure 2B:
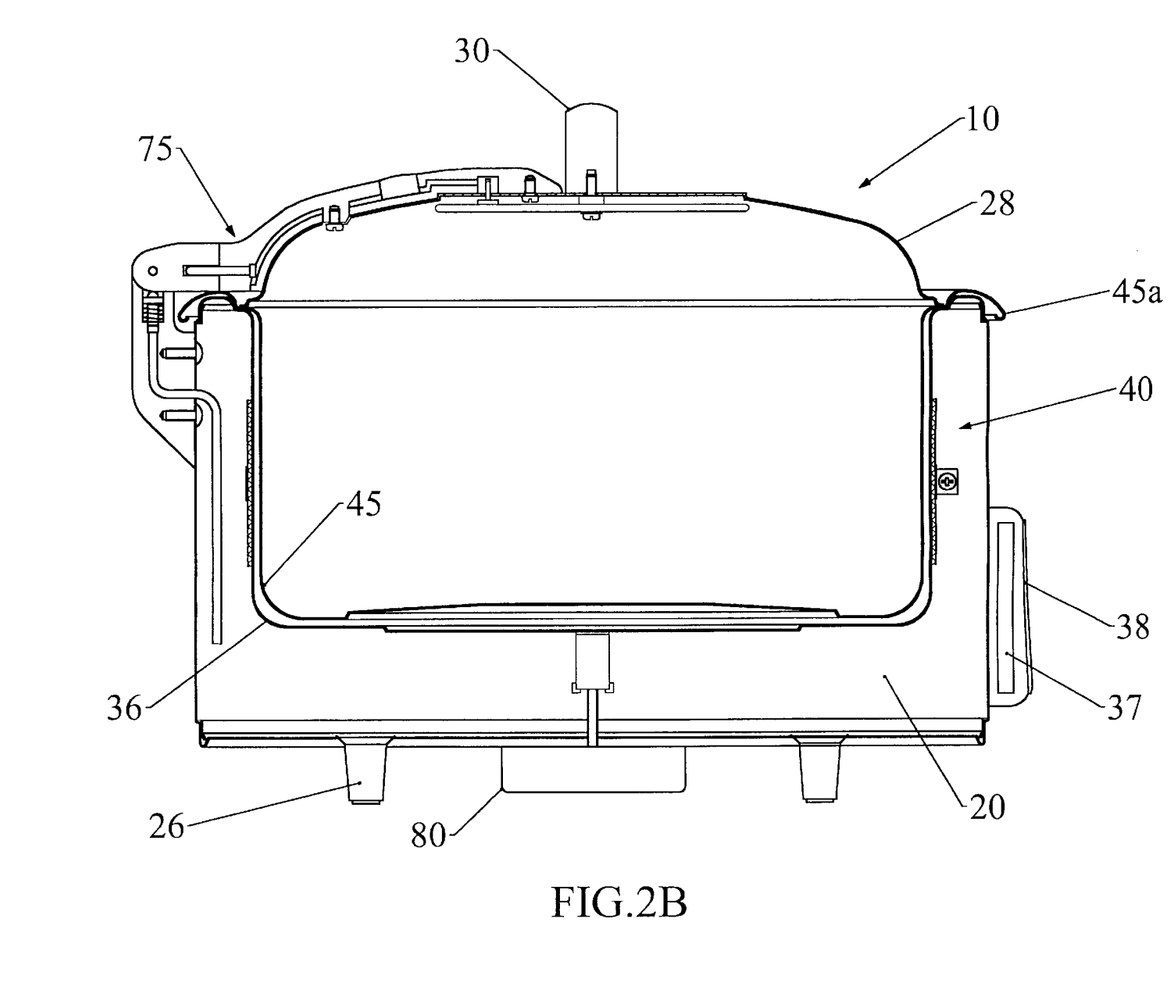
FIG. 2B is a transverse cross-section of the roasting oven showing further details thereof.

The present roasting oven 10 also includes an internal heating well 36 disposed within the housing 22 as more clearly shown in FIGS. 2A and 2B. The heating well 36 is constructed of enamel-coated steel, cast aluminum, cast iron or other material having suitable physical characteristics. Such a roasting oven 10 may include a wrap-around heating element, indicated generally at 40, and/or a top heating element, indicated generally at 150.

In the preferred embodiment the present roasting oven 10 also includes a removable cooking liner 45 including a peripheral flange member 45a which is seated on the upper edge of the housing 22 as shown. The liner 45 is also constructed of stainless steel, enamel-coated steel, cast aluminum or other suitable material. The cooking liner 45 is easily removed from the heating well 36 for washing for the convenience of the user.

A layer of heat-resistant insulating material (not shown) is disposed in the air space as at 20 between the housing 22 and the cooking well 36 as shown in FIGS. 2A and 2B. Numerous types of heat insulating materials having physical and chemical properties suitable for this application are commercially available. Since such heat insulating materials are well known to those skilled in the art, further detailed discussion of the same is not deemed necessary.

The present roasting oven 10 may be constructed in an oval, rectangular, round or other configurations with minor modifications to the heating elements 40, 150.

Referring again to FIG. 1, a control panel, indicated generally at 32, is typically provided on the lower front surface of the housing 22 to carry out the functions of the roasting oven 10. The control panel 32 includes a plurality of temperature control switches 33 which are electrically interconnected with the wrap-around and/or top heating elements 40, 150 and serve to regulate the operation thereof. The control panel 32 also includes a digital display 35, cooking mode switches 31, and a power switch 39.

In the preferred embodiment the control panel 32 is comprised of a heat-resistant housing 34 including a flexible, push button film 38 which overlays an electronic control circuit board 37 (FIG. 2B) that provides the user with fingertip control of the cooking functions. A ventilated compartment 80 is provided wherein the power supply circuit board is protected from the heat source.

The present roasting oven 10 is designed for use with standard household and commercial electrical systems. In the preferred embodiment the wrap-around heating element 40 is designed to operate in the range of 1000–1500 watts and the top heating element 150 to operate in the range of 25 to 75 watts. This wattage rating varies for a given application and capacity of the roasting oven.

Figure 3A:
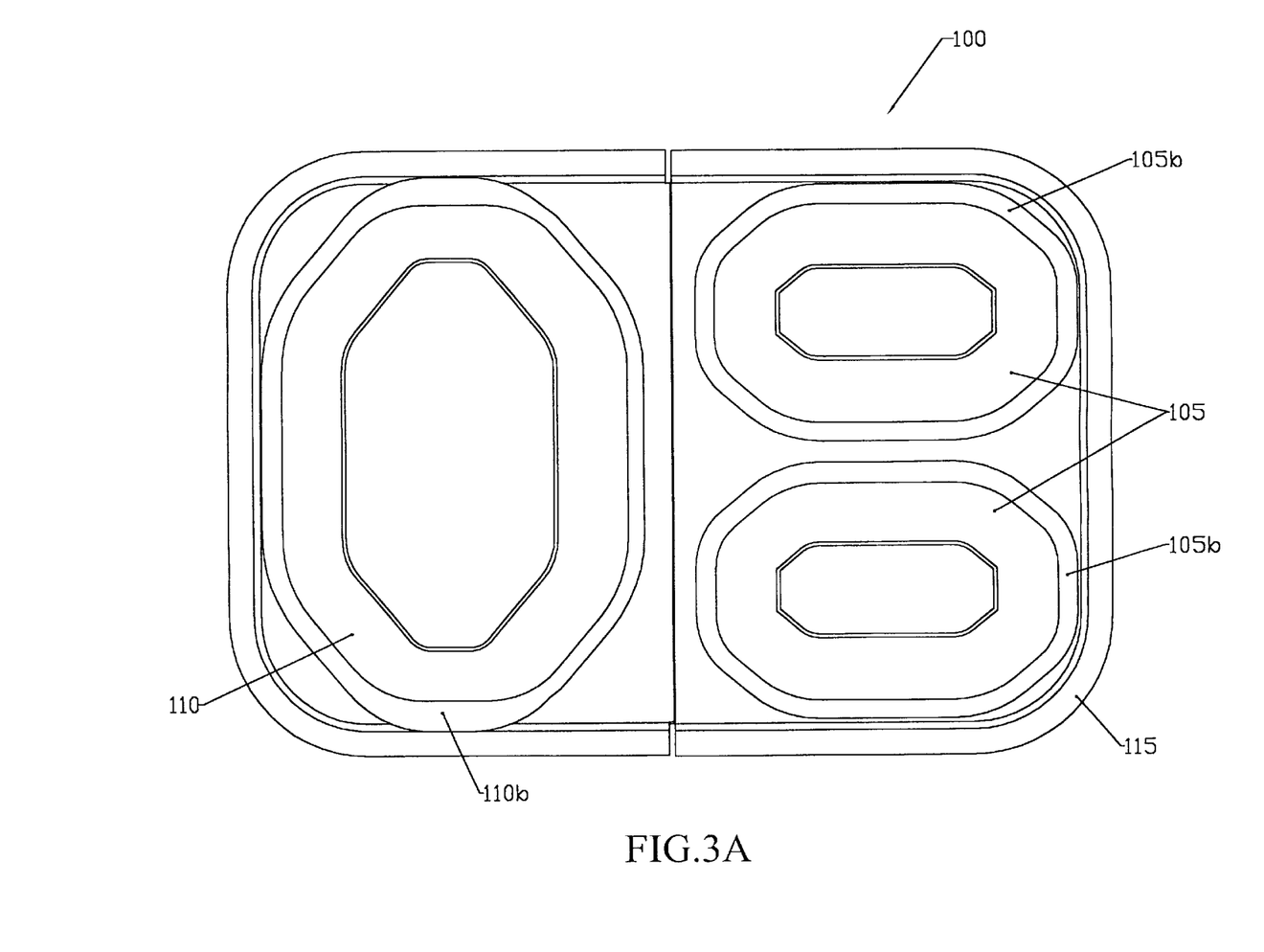
FIG. 3A is a top plan view of the serving set of the present invention.
Figure 3B:
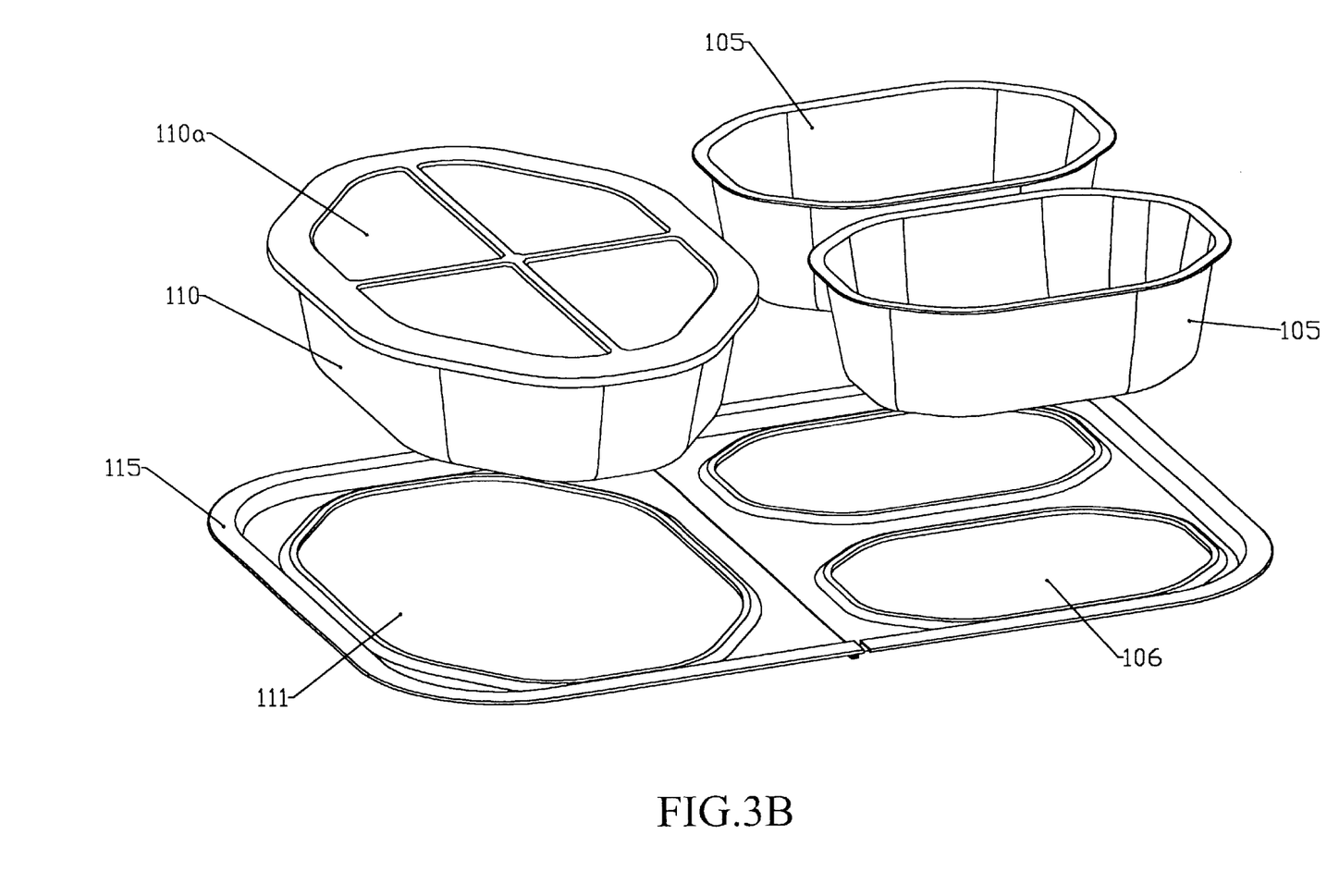
FIG. 3B is an exploded perspective view of the serving set showing the components thereof.

With reference to FIGS. 3A and 3B there is shown therein a food serving set in accordance with the present invention, indicated generally at 100, that is designed for use with such a roasting oven 10. In the preferred embodiment the present serving set 100 is comprised of two small food containers 105 and one large food container 110 each being provided with sealable lid members 105a and 110a respectively and a supporting rack 115 wherein the containers 105, 110 reside during use. It can be seen that the containers 105, 110 are constructed in a generally octagonal shape to conform with mating openings 106 and 111 respectively formed in the supporting rack 115. To this end each container 105, 110 includes a peripheral flange 105b, 110b formed thereon which overlaps and engages a raised edge formed about the periphery of the openings 106, 111 in the supporting rack 115 as shown.

Containers 105, 110 and lid members 105a, 110a respectively may be constructed from heat resistant plastics, engineering resins, sheet metal or other materials having physical and chemical properties suitable for this application.

It will be appreciated that various other geometric shapes and configurations of the containers 105, 110 and mating openings 106, 111 formed in the supporting rack 115 can be utilized. Thus, the embodiments disclosed in the drawings are intended to be merely illustrative and not restrictive in any sense.

Figure 3C:
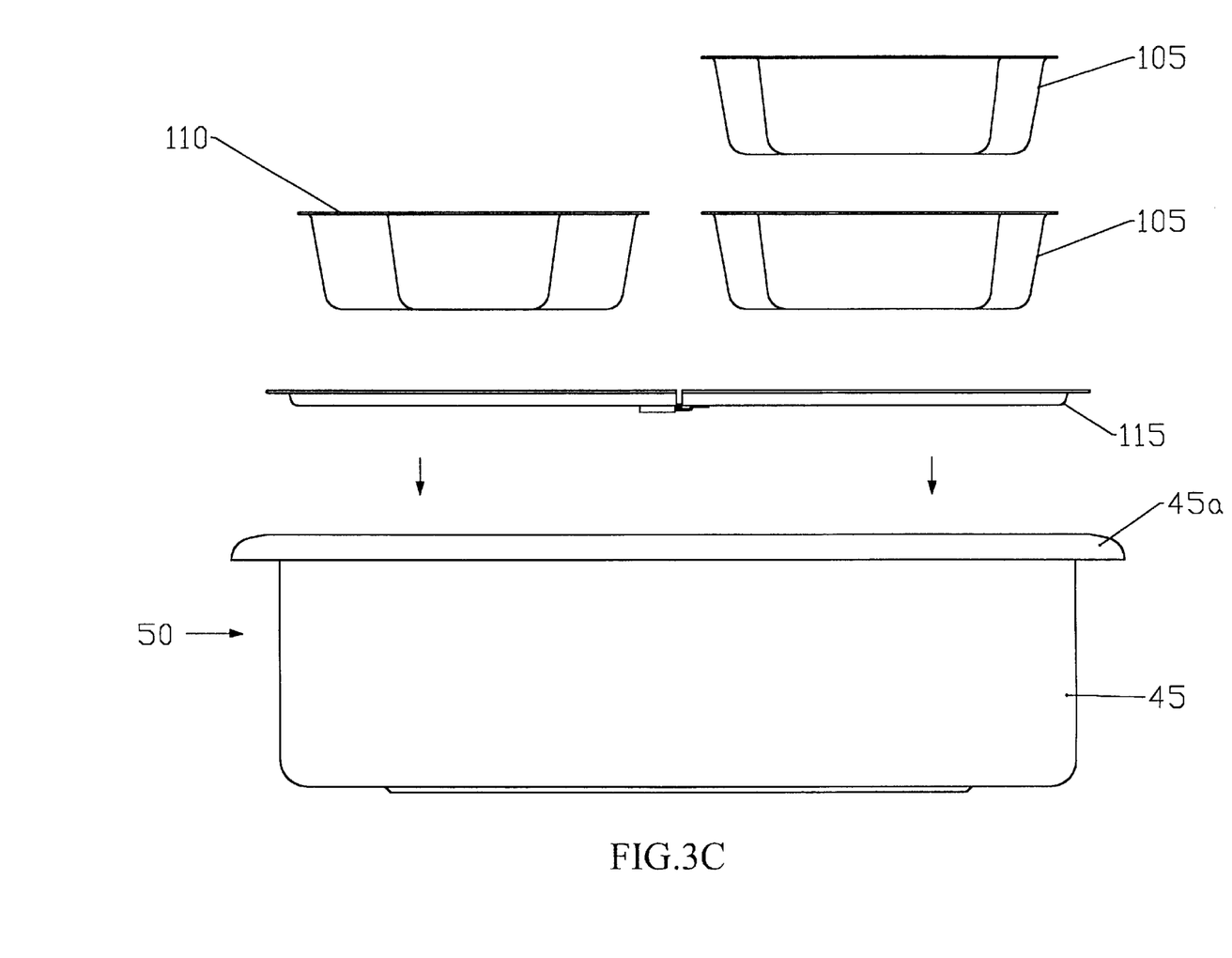
FIG. 3C is an exploded elevational view showing the serving set in relation to the removable liner of the roasting oven.

The supporting rack 115 is configured to reside in the top opening of the roasting oven 10 or other deep well cooker and engages the flange member 45a of the cooking liner 45 as shown in FIG. 3C. In operation the liner 45 is filled with water to a sufficient level as at 50 to contact the food containers 105, 110 when disposed in the supporting rack 115 in order to heat the food items contained therein.

Figure 4:
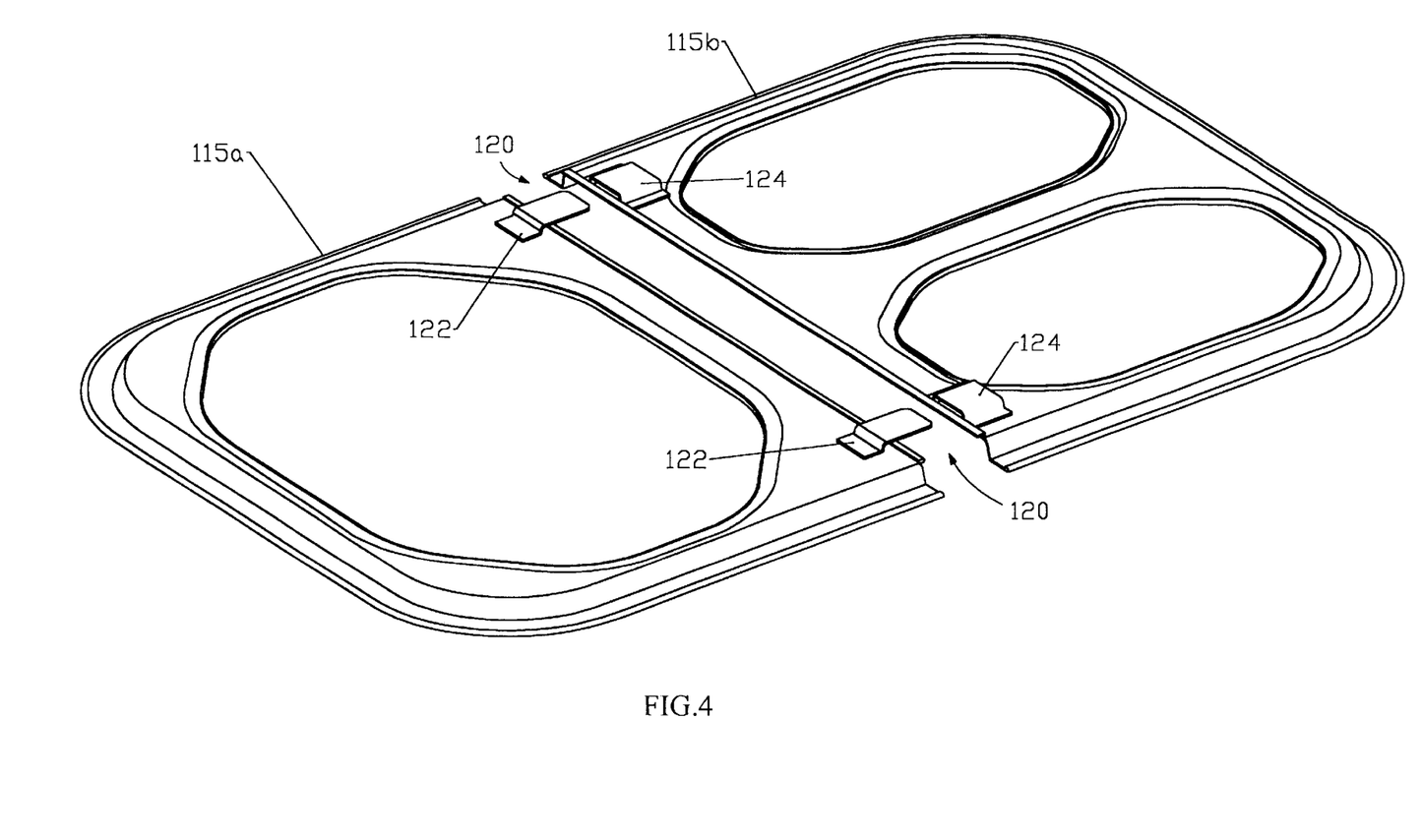
FIG. 4 is a perspective view of the supporting rack of the serving set shown in a disassembled condition.

The supporting rack 115 provides structures comprising collapsing means including, but not limited to, the following structures. Advantageously, the supporting rack 115 is constructed to be easily disassembled into half sections 115a, 115b as shown in FIG. 4 for packaging and storage. In one embodiment this is accomplished by the use of a pair of latch assemblies, indicated generally at 120. Each latch assembly 120 is comprised of a tongue bracket 122 which is installed in sliding engagement with a mating hasp 124 such that the half sections 115a, 115b are detachably secured in position.

It will be appreciated by those skilled in the art that various other types of attaching hardware and quick connect/disconnect fasteners may be utilized for detachably securing the half sections 115a, 115b of the supporting rack 115 and such attaching hardware is understood to be within the scope of the present invention In the preferred embodiment the supporting rack 115 is a stamped metal construction and tongue brackets 122 and hasps 124 are secured to the half sections 115a, 115b by weldment or other suitable fasteners such as rivets.

Figure 5:
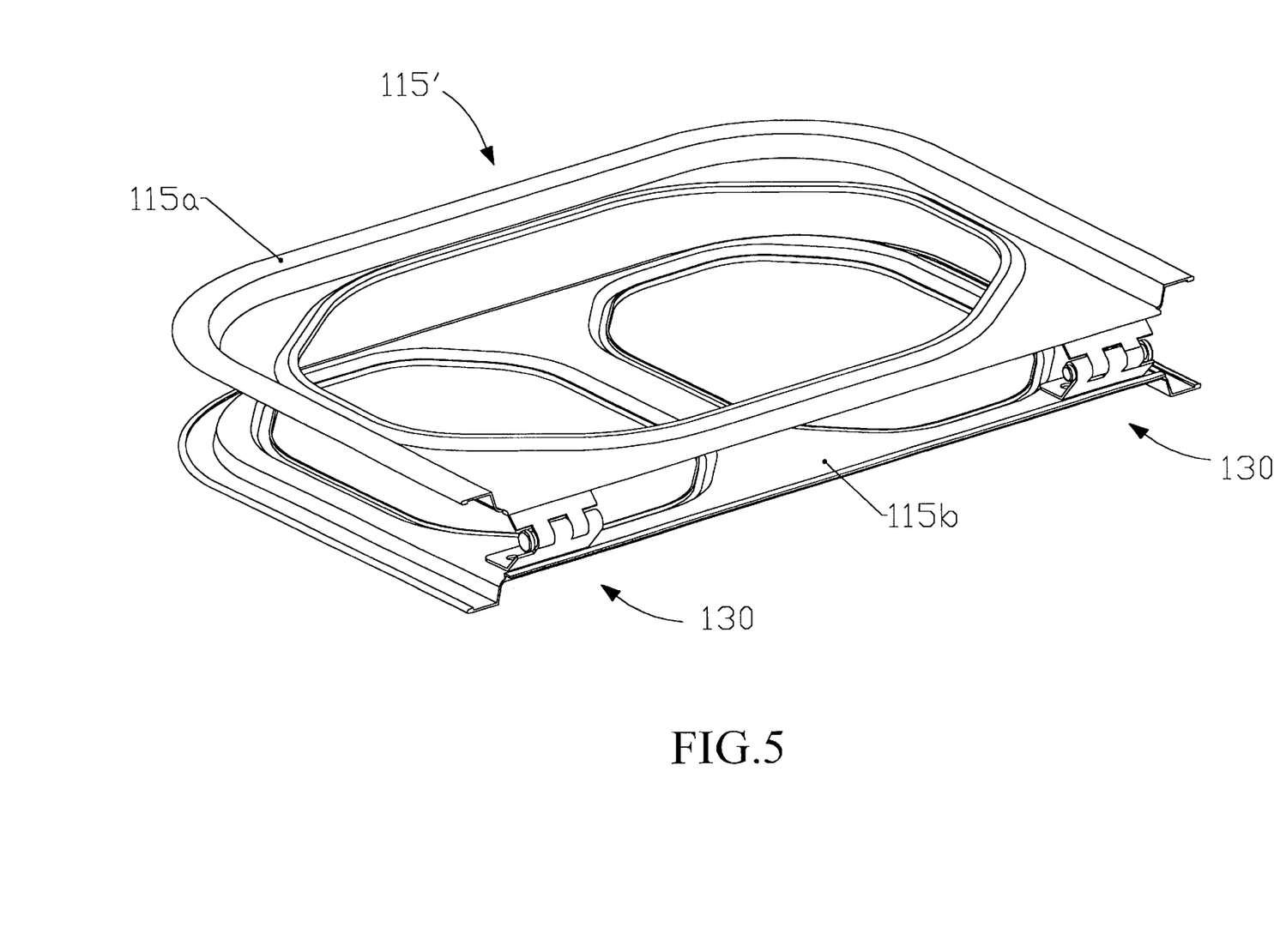
FIG. 5 is a perspective view of an alternative embodiment of the supporting rack of the serving set shown in a folded condition.

In an alternative embodiment the half sections 115a, 115b of supporting rack 115' are permanently joined by hinge assemblies, indicated generally at 130, as shown in FIG. 5. Thus, the supporting rack 115' is foldable 180 degrees onto itself to the position shown for convenient storage within the interior space of the roasting oven 10. Thereafter, the supporting rack 115' is unfolded to a flattened condition for use with the present serving set 100 as described hereinabove.

Figure 6A:
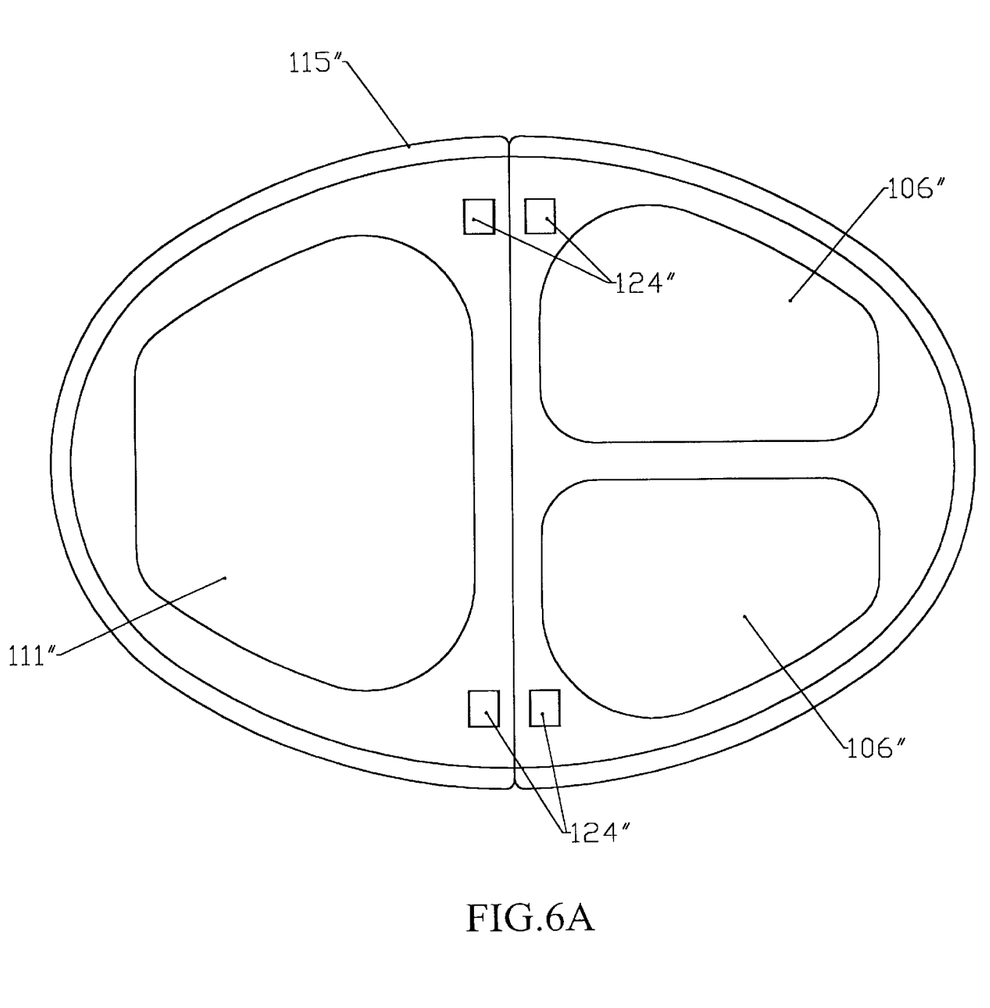
FIG. 6A is a top plan view of an alternative embodiment of the supporting rack in an oval configuration.
Figure 6B:
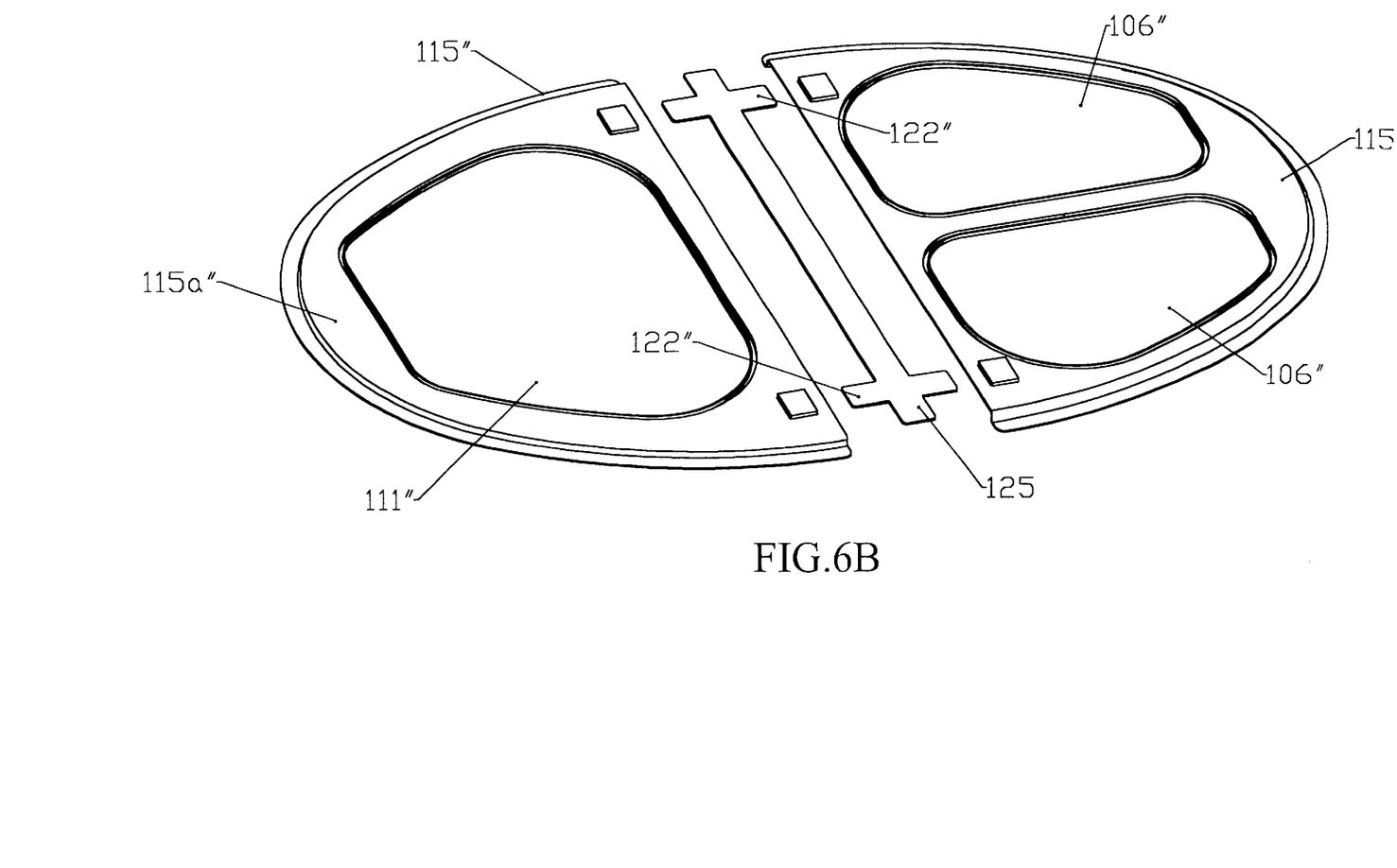
FIG. 6B is a top plan view of the supporting rack of FIG. 6A shown in a disassembled condition.

Of course, the present serving set 100 including the supporting rack 115 can also be adapted for use with roasting ovens or other deep well cookers having different shapes such as an oval configuration. Referring to FIGS. 6A and 6B there is shown therein a modified supporting rack 115" which is oval in configuration having modified openings 106" and 111" formed therein. The food containers (not shown) for this embodiment are configured for mating engagement with their corresponding openings 106", 111". In this embodiment the modified half sections 115a", 115b" are detachably secured by a transverse bracket member 125 whereon a pair of modified tongue brackets 122" are mounted for sliding engagement with mating hasps 124" as shown in FIG. 6B.

Thus, it can be seen that the present invention provides a versatile food serving set for use in combination with a roasting oven or other deep well cooker, which can be utilized for maintaining food items in a ready-to-eat condition. The food serving set features individual food containers, which can be transferred directly from the refrigerator to the cooker. The serving set includes a supporting rack, which positions the food containers within the cooker during use, and which is collapsible for efficient storage and/or packaging within the interior space of the cooker.

Although not specifically illustrated in the drawings, it should be understood that additional equipment and structural components will be provided as necessary, and that all of the components described above are arranged and supported in an appropriate fashion to form a complete and operative roasting oven incorporating features of the present invention.

Moreover, although illustrative embodiments of the invention have been described, a latitude of modification, change, and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. A food serving set for use in combination with a deep well cooker having an interior space including a top opening, said food serving set comprising:
   a plurality of individual food containers of a predetermined configuration; and
   a supporting rack including collapsing means, said supporting rack further including a plurality of openings formed therein conforming to said predetermined configuration for receiving said food containers; said supporting rack being disposed in detachable engagement within said top opening of said deep well cooker such that said food containers are disposed within said interior space for heating of said food items.

2. The food serving set of claim 1 wherein said collapsing means comprises asymmetrical half-sections of said supporting rack being connected by fastening hardware.

3. The food serving set of claim 2 wherein said fastening hardware is a latch mechanism.

4. The food serving set of claim 1 wherein said collapsing means comprises asymmetrical half-sections of said supporting rack connected by hinges such that said supporting rack is foldable for storage within said interior space of said cooker.

5. The food serving set of claim 1 wherein each of said food containers are provided with sealable lid members.

6. The food serving set of claim 1 wherein said supporting rack is generally rectangular in configuration.

7. The food serving set of claim 6 wherein said food containers are generally octagonal in configuration.

8. The food serving set of claim 1 wherein said supporting rack is oval in configuration.

9. An improved deep well cooker having an outer housing, a cooking well including a top opening installed within said housing, a heat source disposed in heating relation to said cooking well and a temperature control switch electrically interconnected to said heat source wherein the improvement comprises:
   a food serving set including a plurality of individual food containers arranged within a collapsible supporting rack disposed in detachable engagement within said top opening of said cooking well such that said food containers are positioned within said cooking well for heating of food items contained therein.

10. The improved deep well cooker of claim 9 said collapsible supporting rack is comprised of asymmetrical half-sections being connected by fastening hardware.

11. The improved deep well cooker of claim 9 said collapsible supporting rack is comprised of symmetrical half-sections being connected by fastening hardware.

12. The improved deep well cooker of claim 10 wherein said fastening hardware is a latch mechanism.

13. The improved deep well cooker of claim 10 wherein said half-sections of said supporting rack are connected by hinges such that said supporting rack is foldable for storage within said interior space of said cooker.

14. The improved deep well cooker of claim 11 wherein said half-sections of said supporting rack are connected by hinges such that said supporting rack is foldable for storage within said interior space of said cooker.

15. The improved deep well cooker of claim 9 wherein each of said food containers is provided with a sealable lid member.

16. The improved deep well cooker of claim 9 wherein said supporting rack is rectangular in configuration.

17. The improved deep well cooker of claim 9 wherein said food containers are generally octagonal in configuration.

18. The improved deep well cooker of claim 9 wherein said supporting rack is oval in configuration.

\* \* \* \* \*